US012804170B2

(12) United States Patent
Sato et al.

(10) Patent No.: US 12,804,170 B2
(45) Date of Patent: Nov. 17, 2026

(54) METHOD, NON-TRANSITORY COMPUTER READABLE MEDIUM, AND VIDEO CODING SYSTEM

(71) Applicant: GUANGDONG OPPO MOBILE TELECOMMUNICATIONS CORP., LTD., Dongguan (CN)

(72) Inventors: Kazushi Sato, Palo Alto, CA (US); Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 17 days.

(21) Appl. No.: 18/725,104

(22) PCT Filed: Dec. 27, 2022

(86) PCT No.: PCT/US2022/082408

§ 371 (c)(1),
(2) Date: Jun. 27, 2024

(87) PCT Pub. No.: WO2023/129913

PCT Pub. Date: Jul. 6, 2023

(65) Prior Publication Data

US 2025/0071298 A1 Feb. 27, 2025

Related U.S. Application Data

(60) Provisional application No. 63/266,172, filed on Dec. 29, 2021.

(51) Int. Cl.
*H04N 19/184* (2014.01)
*H04N 19/117* (2014.01)
(Continued)

(52) U.S. Cl.
CPC ......... *H04N 19/184* (2014.11); *H04N 19/117* (2014.11); *H04N 19/119* (2014.11);
(Continued)

(58) Field of Classification Search
CPC .. H04N 19/117; H04N 19/184; H04N 19/119; H04N 19/176; H04N 19/30; H04N 19/86
See application file for complete search history.

(56) References Cited

U.S. PATENT DOCUMENTS

2014/0003487 A1* 1/2014 Haque .................... H04N 19/70 375/240.02
2015/0110167 A1* 4/2015 Chen ...................... H04N 19/31 375/240.01

(Continued)

FOREIGN PATENT DOCUMENTS

WO 2017093611 A1 6/2017
WO 2020141248 A1 7/2020
WO 2021249994 A1 12/2021

OTHER PUBLICATIONS

"Overview of the Versatile Video Coding (VVC) Standard and its Applications", IEEE Transactions on Circuits and Systems for Video Technology, Oct. 2021. (29 pages).

(Continued)

*Primary Examiner* — Nam D Pham
(74) *Attorney, Agent, or Firm* — Sheppard, Mullin, Richter & Hampton LLP

(57) ABSTRACT

A method includes: obtaining a multilayer bit stream of a video data block; decoding the multilayer bit stream of the video data block, the multilayer bit stream comprising at least part of the video data block that has been encoded, wherein the multilayer bit stream includes one or more layers and one or more temporal sublayers; and decoding, from the multilayer bit stream, one or more first coding (Continued)

parameters, wherein the one or more first coding parameters are independently associated with a first layer of the one or more layers.

20 Claims, 7 Drawing Sheets

(51) Int. Cl.
*H04N 19/119* (2014.01)
*H04N 19/124* (2014.01)
*H04N 19/176* (2014.01)
*H04N 19/30* (2014.01)
*H04N 19/70* (2014.01)
*H04N 19/82* (2014.01)
*H04N 19/86* (2014.01)

(52) U.S. Cl.
CPC ......... *H04N 19/124* (2014.11); *H04N 19/176* (2014.11); *H04N 19/30* (2014.11); *H04N 19/70* (2014.11); *H04N 19/82* (2014.11); *H04N 19/86* (2014.11)

(56) References Cited

U.S. PATENT DOCUMENTS

2019/0335185 A1* 10/2019 Lee ........................ H04N 19/31
2021/0258587 A1* 8/2021 Lai ........................ H04N 19/187

OTHER PUBLICATIONS

"Versatile Video Coding Editorial Refinements on Draft 10", JVET-T2001-v1, Oct. 2020. (511 pages).
"Algorithm description of Enhanced Compression Model 2 (ECM2)", JVET-W2025, Jul. 2021. (22 pages).
"BT.709: Parameter values for the HDTV standards for production and international programme exchange". www.itu.net (n.d.). Jun. 2015. (10 pages).
"BT.2020: Parameter values for ultra-high definition television systems for production and international programme exchange". International Telecommunication Union. Jun. 2014. (8 pages).
"ITU-T Recommendation H.265: High efficiency video coding", Aug. 2021. (716 pages).
"Color Gamut Scalable Video Coding", JCTVC-L0334, Jan. 2013. (10 pages).
"VTM common test conditions and software reference configurations for SDR video", JVET-T2010-v1, Oct. 2020. (6 pages).
"AHG10: Deblocking filter setting for VTM", JVET-X0063-v1, Oct. 2021. (3 pages).
"Overview of Color Gamut Scalability", IEEE Transactions on Circuit and Systems for Video Technology, Jul. 2017. (14 pages).
"EE2: Summary Report on Enhanced Compression beyond VVC capability", JVET-X0024-v2, Oct. 2021. (15 pages).
"EE2: Encoder partitioning optimization for ECM and crosscheck of EE2-1.1", JVET-X0144-v4, Oct. 2021. (5 pages).
Boyce et al., "Overview of SHVC: Scalable Extensions of the High Efficiency Video Coding Standard", IEEE, Jan. 2016. (15 pages).
WIPO, International Search Report and Written Opinion for International Application No. PCT/US2022/082408, Apr. 7, 2023. (11 pages).
Choi, et al., "MV-HEVC/SHVC HLS: VPS extension for multi-format" Joint Collaborative Team on 3D Video Coding Extensions of ITU-T SG 16 WP 3 and ISO/IEC JTC 1/SC 29/WG 11, JCT3V-E0116, Samsung Electronics Co., Ltd., dated Jul. 27-Aug. 2, 2013, Vienna, AT, 10 pages.
Rapaka, et al., "MV-HEVC/SHVC HLS: On early indication of parallel processing tools in HEVC extensions" Joint Collaborative Team on Video Coding (JCT-VC) of ITU-T SG 16 WP 3 and ISO/IEC JTC 1/SC 29/WG 11, JCTVC-O0226, Qualcomm Incorporated, dated Oct. 23-Nov. 1, 2013, Geneva, CH, 2 pages.
Extended European Search Report issued in corresponding EP application No. 22917505.4 dated Dec. 2, 2025. 11 pages.

* cited by examiner

METHOD, NON-TRANSITORY COMPUTER READABLE MEDIUM, AND VIDEO CODING SYSTEM

CROSS-REFERENCE TO RELATED APPLICATIONS

This application is National Stage of International Application No. PCT/US2022/082408, filed Dec. 27, 2022, which claims priority to U.S. Provisional Patent Application No. 63/266,172, filed Dec. 29, 2021, the disclosures of which are incorporated herein by reference in their entireties.

FIELD

The present disclosure relates, in general, to a method, a non-transitory computer readable medium, and a video coding system.

BACKGROUND

Versatile Video Coding (VVC) is a video coding standard that offers improved performance and efficiency over preceding standards, such as Advanced Video Coding (AVC) and High Efficiency Video Coding (HEVC). Conventionally, in VVC, chroma quantization, deblocking filter, and block partitioning related parameters are specified on a picture-by-picture basis under the current VVC specification, which may be redundant if the same values are applied to all the pictures associated with the same temporal layer.

Thus, an expanded framework for transmitting parameters on a layer basis or temporal sublayer basis is set forth in the embodiments below.

SUMMARY

A method includes obtaining a multilayer bit stream of a video data block, and decoding the multilayer bit stream of the video data block, the multilayer bit stream comprising at least part of the video data block that has been encoded, wherein the multilayer bit stream includes one or more layers and one or more temporal sublayers. The method further includes decoding, from the multilayer bit stream, one or more first coding parameters, wherein the one or more first coding parameters are independently associated with a first layer of the one or more layers.

A non-transitory computer readable medium in communication with a processor is provided, the non-transitory computer readable medium having encoded thereon a set of instructions executable by the processor to: obtain a multilayer bit stream of a video data block; decode the multilayer bit stream of the video data block, the multilayer bit stream comprising at least part of the video data block that has been encoded, wherein the multilayer bit stream includes one or more layers and one or more temporal sublayers; and decode, from the multilayer bit stream, one or more first coding parameters, wherein the one or more first coding parameters are independently associated with one of: a layer of the one or more layers; or a temporal sublayer of the one or more temporal sublayers.

A video coding system comprises: a decoder further comprising: a processor; a non-transitory computer readable medium in communication with the processor, the non-transitory computer readable medium having encoded thereon a set of instructions executable by the processor to: decode a multilayer bit stream of a video data block, the multilayer bit stream comprising at least part of the video data block that has been encoded, wherein the multilayer bit stream includes one or more layers and one or more temporal sublayers; and decode, from the multilayer bit stream, one or more first coding parameters, wherein the one or more first coding parameters are independently associated with a layer of the one or more layers.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
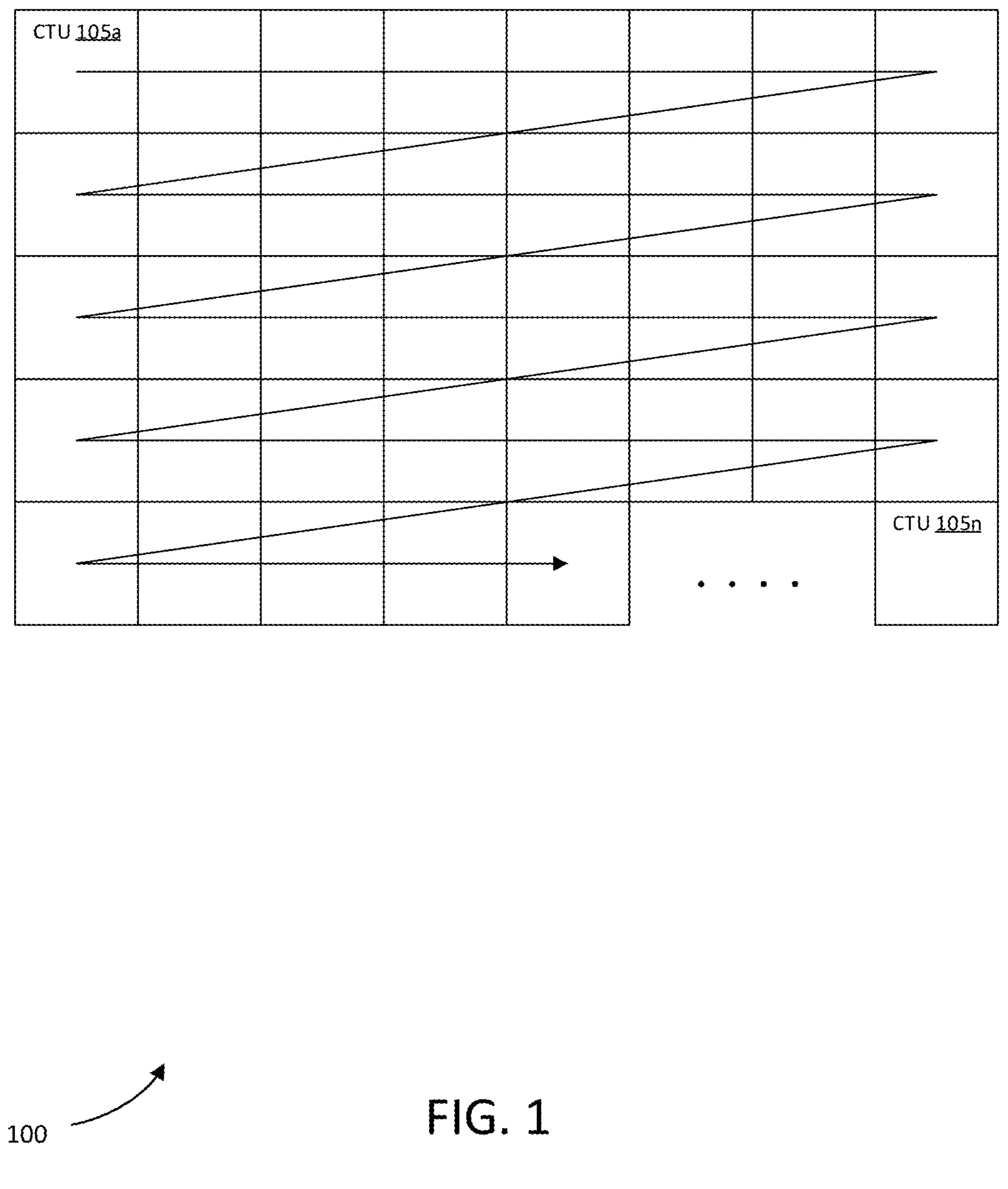
FIG. 1 is a schematic diagram of a coding tree unit (CTU), in accordance with various embodiments.

Various embodiments provide tools and techniques for layer-based and temporal sublayer-based coding.

In some embodiments, a method for layer-based and temporal sublayer-based coding is provided. A method includes obtaining a multilayer bit stream of a video data block, and generating a multilayer bit stream based on the video data block, the multilayer bit stream comprising at least part of the video data block that has been encoded, wherein the multilayer bit stream includes one or more layers and one or more temporal sublayers. The method further includes decoding, from the multilayer bit stream, one or more first coding parameters, wherein the one or more first coding parameters are independently associated with a first layer of the one or more layers.

In some examples, the method may further include transmitting the multilayer bit stream, and decoding the first layer of the multilayer bit stream according to the one or more first coding parameters. In some examples, the one or more first coding parameters includes one or more of a quantization parameter offset, a deblocking filter parameter, or a block partitioning parameter. In some examples, the one or more first coding parameters are syntax elements in a video parameter set (VPS).

In some examples, the method may further include decoding, from the multilayer bit stream, one or more second coding parameters, wherein the one or more second coding parameters are independently associated with a first temporal sublayer of the one or more temporal sublayers. In some examples, the method may further include transmitting the multilayer bit stream, and decoding the first temporal sublayer of the multilayer bit stream according to the one or more second coding parameters. In some examples, the one or more second coding parameters includes one or more of a quantization parameter offset, deblocking filter parameter, or a block partitioning parameter. In some examples, the one or more second coding parameters includes syntax elements in a sequence parameter set (SPS).

In some embodiments, an apparatus for layer-based and temporal sublayer-based coding is provided. An apparatus includes a non-transitory computer readable medium in communication with the processor, the non-transitory computer readable medium having encoded thereon a set of instructions executable by the processor to perform various functions. The set of instructions may be executable by the processor to obtain a video data block, and decode a multilayer bit stream of a video data block, the multilayer bit stream comprising at least part of the video data block that has been encoded, wherein the multilayer bit stream includes one or more layers and one or more temporal sublayers. The set of instructions may further be executed by the processor to decode, from the multilayer bit stream, one or more first coding parameters, wherein the one or more first coding parameters are independently associated with one of: a layer of the one or more layers, or a temporal sublayer of the one or more temporal sublayers.

In some examples, the set of instructions is further executable by the processor to decode one of the layer of the one or more layers or the temporal sublayer of the one or more temporal sublayers according to the one or more first coding parameters. In some examples, the one or more first coding parameters includes one or more of a quantization parameter offset, a deblocking filter parameter, or a block partitioning parameter. In some further examples, the one or more first coding parameters further includes one or more of a scaling list, adaptive loop filter parameter, or sample adaptive offset. In some examples, the block partitioning parameter may be defined for each layer of the one or more layers and each temporal sublayer of the one or more temporal sublayers. In yet further examples, the quantization parameter includes a quantization parameter offset applied to luma for extracting the quantization parameter for chroma, for the layer of the one or more layers.

In some examples, the one or more first coding parameters may include syntax elements in a video parameter set (VPS) or sequence parameter set (SPS).

In further embodiments, a system for layer-based and temporal sublayer-based coding is provided. A system includes a decoder further comprising a processor and a non-transitory computer readable medium in communication with the processor, the non-transitory computer readable medium having encoded thereon a set of instructions executable by the processor to decode a multilayer bit stream of a video data block, the multilayer bit stream comprising at least part of the video data block that has been encoded, wherein the multilayer bit stream includes one or more layers and one or more temporal sublayers, and decode, from the multilayer bit stream, one or more first coding parameters, wherein the one or more first coding parameters are independently associated with a layer of the one or more layers.

In some examples, the system may further include an encoder in communication with the decoder, wherein the set of instructions is further executable by the processor to receive the multilayer bit stream from the encoder, and decode the layer of the one or more layers according to the one or more first coding parameters. In some examples, the one or more first coding parameters includes one or more of a chroma quantization parameter offset, a deblocking filter parameter, or a block partitioning parameter.

In some examples, the set of instructions is further executable by the processor to decode, from the multilayer bit stream, one or more second coding parameters, wherein the one or more second coding parameters are independently associated with a temporal sublayer of the one or more temporal sublayers. In some examples, the decoder may be configured to decode the temporal sublayer of the one or more temporal sublayers according to the one or more second coding parameters.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

In conventional VVC, multilayer coding of several parameters, such as offset for chroma quantization parameter derivation, deblocking filter strength adjustment, and block partitioning parameters, are coded at the picture-level (e.g., on a picture-by-picture basis). This may lead to redundancies and inefficient coding of a bit stream. For example, the image quality of the lower temporal layers affects that of higher temporal layers. Taking this into consideration deblocking filter parameters or chroma quantization parameters can be adjusted for coding efficiency improvements or subjective quality. However, if the same values are applied to all pictures associated with the same temporal layer, this can lead to redundant coding.

Thus, a more efficient coding framework for layer-based and sublayer-based coding is provided. Specifically, a coding syntax and corresponding framework for layer-based and sub-layer based coding are set forth below.

FIG. 1 is a schematic diagram of an image (e.g., frame 100) divided into blocks called coding tree units (CTUs). Accordingly, an image, such as a frame 100 of a video signal, may be divided into one or more CTUs 105*a*-105*n* (collectively CTUs 105). According to various embodiments, during coding, an input image (such as frame 100) may be divided into one or more CTUs 105*a*-105*n*. The CTUs 105 may each individually be square blocks of pixels, as shown in FIG. 1. In some embodiments, an individual CTU of the CTUs 105 may be a block 128×128 pixels. In some embodiments, as depicted, frame 100 may be divided into CTUs 105. The one or more CTUs 105*a*-105*n* may, in some examples, be scanned in a raster scan order, as depicted. In other embodiments, a different scan order, such as a z-scan order, may be used. Each CTU 105*a*-105*n* of a frame 100 may respectively be partitioned into one or more CUs.

Figure 2:
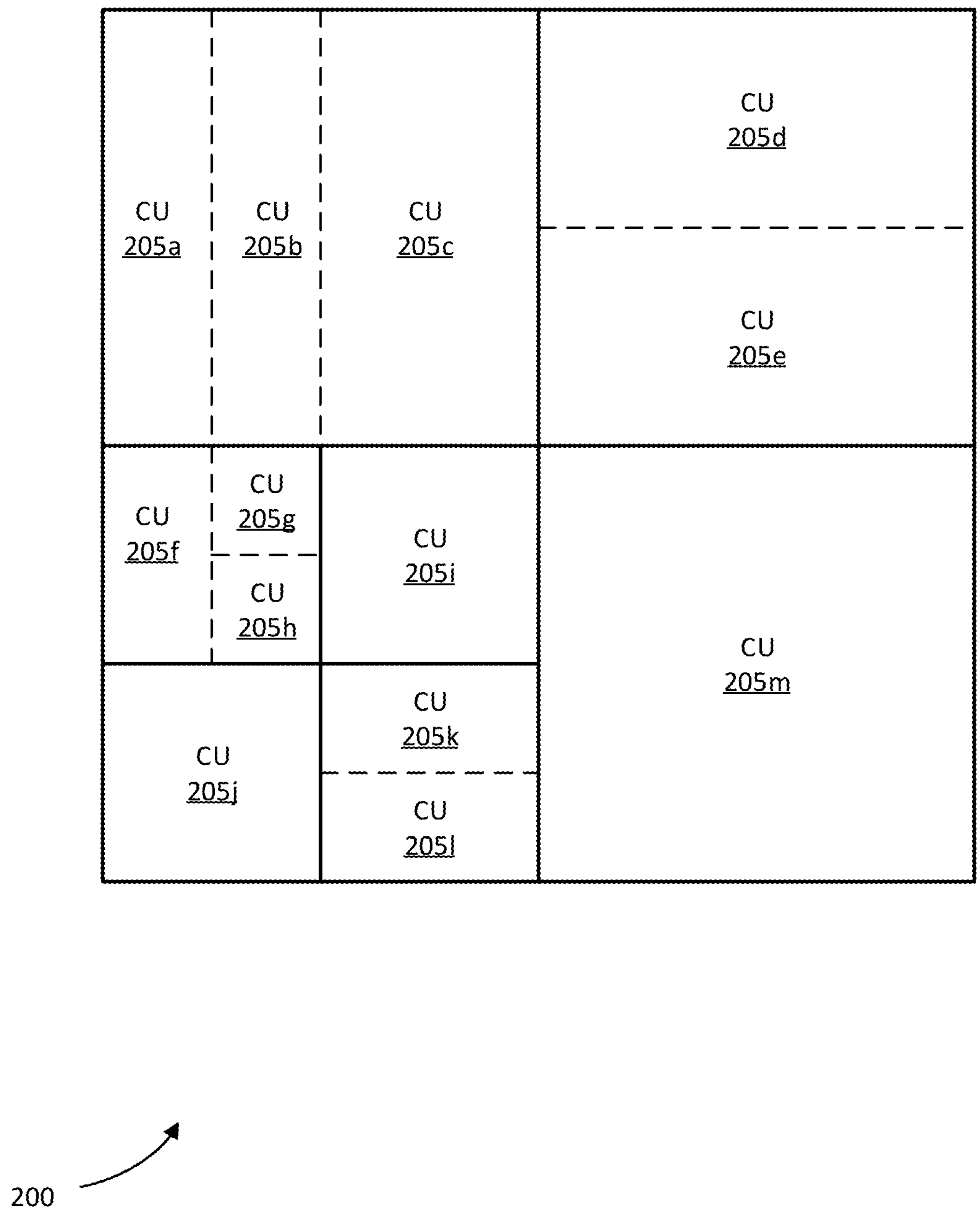
FIG. 2 is a schematic diagram of a CTU divided into multiple coding units (CU), in accordance with various embodiments.

FIG. 2 is a schematic diagram of a CTU 200 divided into one or more coding units (CUs) 205*a*-205*m* (collectively CUs 205). In various embodiments, CUs 205 may be sub-units of a CTU, which may be used for prediction and transform during coding operations. CUs 205*a*-205*m* may be rectangular or square in arrangement, and further may be coded without further partitioning into prediction blocks or transform blocks. Each CU 205*a*-205*m* may be as large as its root CTU 200 and/or a subdivision of the CTU 200. For example, the CTU may be divided into subdivisions of up to 4×4 blocks (e.g., up to 16 total blocks). Thus, a CU 205, such as CU 205*j*, 205*i* may be the size of a single subdivision of the CTU 200. The CU 205 may further be smaller than the root CTU 200 and/or subdivision of the CTU 200, as shown by the CUs 205*a*-205*h*, 205*k*-205*l*. In some embodiments, the CUs 205*a*-205*m* may be coded, for example, in a Z-scan order, in the order labeled 205*a*-205*m*. It should be noted that the various CUs 205 of the CTU 200 are schematically illustrated in FIG. 2, and that modifications to the partitioning of a CTU 200 may be possible in accordance with the various embodiments.

Figure 3:
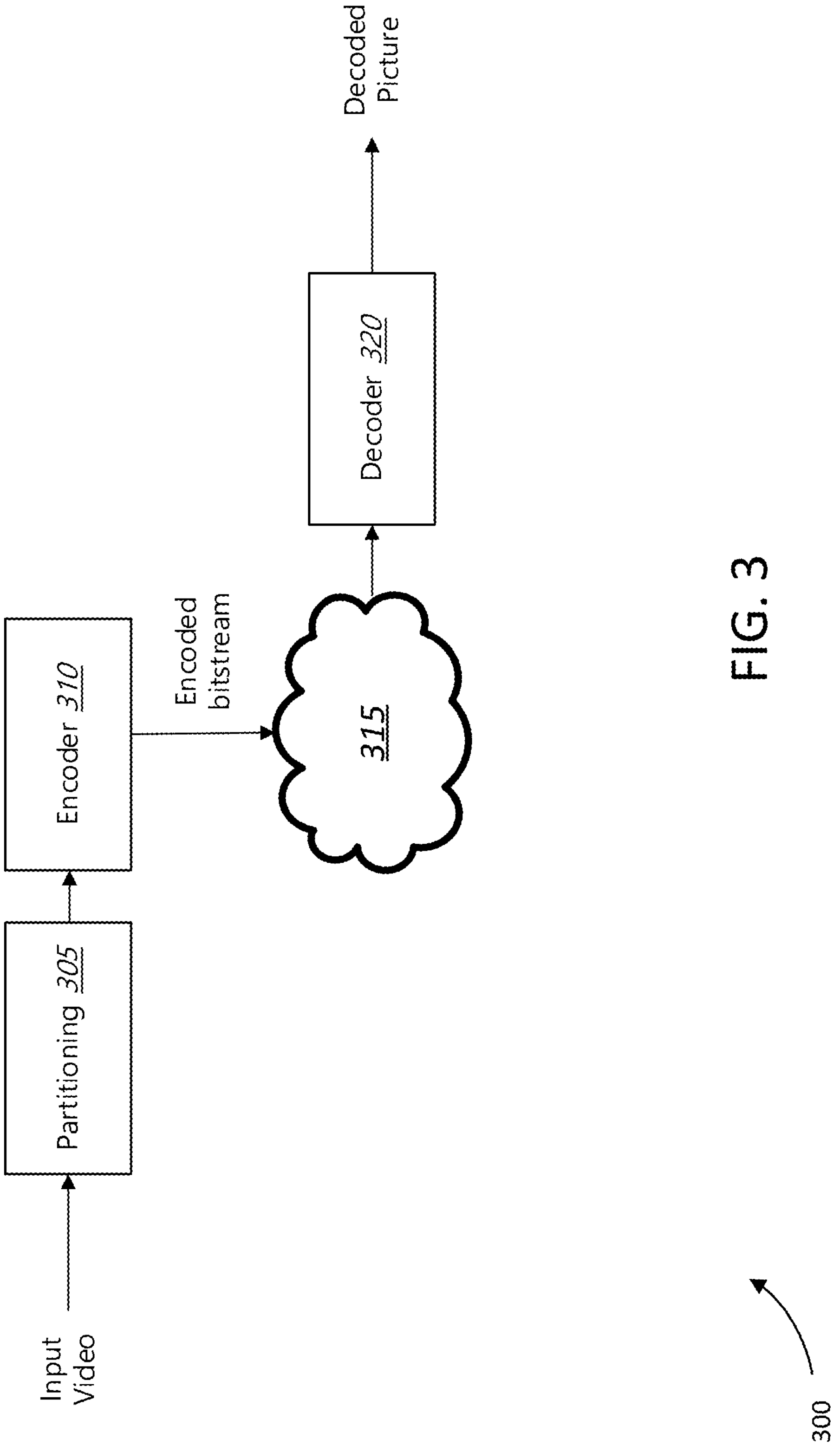
FIG. 3 is a schematic diagram of a system for layer-based and temporal sublayer-based coding, in accordance with various embodiments.

FIG. 3 is a schematic diagram of a system 300 for layer-based and sublayer-based coding, in accordance with various embodiments. The system 300 includes partitioning logic 305, encoder 310, network 315, and decoder 320. It should be noted that the various components of the system 300 are schematically illustrated in FIG. 3, and that modifications to the various components and other arrangements of the system 300 may be possible and in accordance with the various embodiments.

In various examples, an input video signal may be provided to partitioning logic 305. Partitioning logic 305 may be configured to partition the video data into slices, and further, into CTUs and/or CUs, as previously described. Each block may be provided to encoder 310, which may in turn encode the blocks into a coded, multilayer bit stream.

In various examples, a multilayer bit stream may be a combined bit stream that includes respective bit streams of multiple layers of a video. For example, in some embodiments, a multilayer bit stream may include bit streams for multiple formats (e.g., resolution, screen size, bandwidth, device, etc.). Thus, each layer of the multilayer bit stream may correspond to a respectively formatted video. In further embodiments, the respective layers of the bit stream may further include one or more sublayers. Sublayers may include, in some embodiments, a temporal sublayer. For example, a temporal sublayer may correspond to different frame rates of a video bit stream. Thus, in various embodiments, the multilayer bit stream may include one or more layers, and each layer may further include one or more respective sublayers. The decoder 320 may, in various examples, be configured to receive the multilayer bit stream, and decode the multilayer bit stream to generate one or more decoded pictures.

Accordingly, in various embodiments, the encoder 310 may include coding logic (such as residual coding logic or entropy coding logic) configured to generate the respective multilayer bit streams. The coding logic may further be configured to format the bit stream with appropriate header information and syntax elements.

For example, in various embodiments, coding logic may be configured to define various syntax elements on a layer-basis. In some examples, the syntax elements may be defined in VVC (or similar to those in VVC) and implemented on a layer- or sublayer-basis, while some syntax elements are defined as set forth below.

For example, in some embodiments, coding logic may be configured to define, in video parameter set (VPS), a chroma quantization parameter offset syntax element, "chroma_qp_offset." In various examples, chroma_qp_offset may be transmitted for each layer to indicate the quantization parameter (QP) offset for luma to extract the quantization parameter for chroma at a respective VPS layer. In further embodiments, a deblocking filter strength may be adjusted through syntax elements "beta_offset" and "tc_offset." Thus, beta_offset and tc_offset may be defined for each layer, similar to chroma_qp_offset. In further embodiments, a maximum multi-type tree (MTT) hierarchical depth, or "MaxMTTHierarchyDepth," for block (e.g., CU) partitioning may be defined for each layer in similar fashion.

In yet further embodiments, chroma_qp_offset, beta_offset, tc_offset, and MaxMTTHierarchyDepth may be defined for each temporal sublayer. In some examples, the syntax elements for each temporal sublayer may be defined in VPS and/or sequence parameter set (SPS). In some embodiments, MaxMTTHierarchyDepth may be specified for each layer and/or temporal sublayer in SPS.

In further embodiments, additional parameters may be defined on a layer- or sublayer-basis. Additional parameters may include, without limitation, a scaling list, adaptive loop filter (ALF) parameters, sample adaptive offset (SAO), etc. These and other parameters, and corresponding VPS syntax elements are further set forth below with respect to table 1.

TABLE 1

Layer-based and Temporal Sublayer-based VPS Syntax

| video_parameter_set_rbsp( ) { | Descriptor |
|---|---|
| ... | |
| vps_max_layers_minus1 | u(6) |
| vps_max_sublayers_minus1 | u(3) |
| ... | |
| vps_layer_chroma_qp_offset_present_flag | u(1) |
| if( vps_layer_chroma_qp_offset_present_flag ) { | |
| for( i = 0; i <= vps_max_layers_minus1; i++ ) { | |
| vps_layer_cb_qp_offset[ i ] | se(v) |
| vps_layer_cr_qp_offset[ i ] | se(v) |
| vps_layer_joint_cbcr_qp_offset_present_flag[i] | u(1) |
| if ( vps_layer_joint_cbcr_qp_offset_present_flag[i] ) | |
| vps_layer_joint_cbcr_qp_offset[ i ] | se(v) |
| } | |
| } | |
| ... | |
| vps_layer_deblocking_params_present_flag | u(1) |
| if( vps_layer_deblocking_params_present_flag ) { | |
| for( i = 0; i <= vps_max_layers_minus1; i++ ) { | |
| vps_layer_deblocking_filter_disabled_flag[i] | u(1) |
| if( !vps_layer_deblocking_filter_disabled_flag[i]){ | |
| vps_layer_luma_beta_offset_div2[i] | se(v) |
| vps_layer_luma_tc_offset_div2[i] | se(v) |
| vps_layer_chroma_deblocking_filter_params_present_flag[i] | u(1) |
| if( vps_layer_chroma_deblocking_filter_params_present_flag[i] ){ | |
| vps_layer_cb_beta_offset_div2[i] | se(v) |
| vps_layer_cb_te_offset_div2[i] | se(v) |
| vps_layer_cr_beta_offset_div2[i] | se(v) |
| vps_layer_cr_tc_offset_div2[i] | se(v) |
| } | |
| } | |
| } | |
| } | |
| ... | |
| vps_sublayer_chroma_qp_offset_present_flag | u(1) |
| if( vps_sublayer_chroma_qp_offset_present_flag ) { | |
| for( i = 0; i <= vps_max_sublayers_minus1; i++ ) { | |
| vps_sublayer_cb_qp_offset[ i ] | se(v) |
| vps_sublayer_cr_qp_offset[ i ] | se(v) |
| vps_sublayer_joint_cbcr_qp_offset present_flag[i] | u(1) |
| if ( vps_sublayer_joint_cbcr_qp_offset_present_flag[i] ) | |
| vps_sublayer_joint_cbcr_qp_offset[ i ] | se(v) |
| } | |
| } | |
| ... | |
| vps_sublayer_deblocking_params_present_flag | u(1) |
| if( vps_sublayer_deblocking_params_present_flag ) { | |
| for( i = 0; i <= vps_max_sublayers_minus1; i++ ) { | |
| vps_sublayer_deblocking_filter_disabled_flag[i] | u(1) |
| if( !vps_sublayer_deblocking_filter_disabled_flag[i]){ | |
| vps_sublayer_luma_beta_offset_div2[i] | se(v) |
| vps_sublayer_luma_tc_offset_div2[i] | se(v) |
| vps_sublayer_chroma_deblocking_filter_params_present_flag[i] | u(1) |
| if( vps_sublayer_chroma_deblocking_filter_params_present_flag[i] ){ | |
| vps_sublayer_cb_beta_offset_div2[i] | se(v) |
| vps_sublayer_cb_tc_offset_div2[i] | se(v) |
| vps_sublayer_cr_beta_offset_div2[i] | se(v) |
| vps_sublayer_cr_tc_offset_div2[i] | se(v) |
| } | |
| } | |
| ... | |
| vps_layer_partitioning information_present_flag | u(1) |
| if( vps_layer_partitioning_information_present_flag) { | |
| for( i = 0; i <= vps_max_layers_minus1; i++ ) { | |

TABLE 1-continued

| Layer-based and Temporal Sublayer-based VPS Syntax | |
|---|---|
| vps_layer_MaxMTTHierarchyDepth[i] | ue(v) |
| } | |
| ... | |
| vps_sublayer_partitioning_information_present_flag | u(1) |
| if( vps_sublayer_partitioning_information_present_flag ) { | |
| for( i = 0; i <= vps_max_sublayers_minus1; i++ ) { | |
| vps_sublayer_MaxMTTHierarchyDepth[i] | ue(v) |
| } | |
| } | |
| } | |

In various examples, as set forth above in table 1, the various parameters may be defined as follows. The syntax element vps_layer_chroma_qp_offset_present_flag, when equal to 1, specifies that vps_layer_cb_qp_offset, vps_layer_cr_qp_offset, and joint_cbcr_qp_offset_present_flag for the i-th layer are present in the VPS syntax, where i is an integer. vps_layer_chroma_qp_offset_present_flag equal to 0 specifies that vps_layer_cb_qp_offset, vps_layer_cr_qp_offset, and joint_cbcr_qp_offset_present_flag for the i-th layer are not present in the VPS syntax. When not present, the value of vps_layer_chroma_qp_offset_present_flag is taken to be equal to 0.

Continuing with the example above, vps_layer_cb_qp_offset[i] and vps_layer_cr_qp_offset[i] specify the offsets for the i-th layer to the luma quantization parameter $Qp'_Y$ used for deriving $Qp'_{Cb}$ and $Qp'_{Cr}$, respectively The value of vps_layer_cb_qp_offset[i] and vps_layer_cr_qp_offset[i] may be defined such that it shall be in the range of −N to N, e.g. N as 12 inclusive. When not present, the values of vps_layer_cb_qp_offset[i] and vps_layer_cr_qp_offset[i] are taken to be equal to 0.

In further examples, vps_layer_joint_cbcr_qp_offset_present_flag[i] equal to 1 specifies that vps_layer_joint_cbcr_qp_offset[i] for the i-th layer is present in the VPS syntax. vps_layer_joint_cbcr_qp_offset_present_flag[i] equal to 0 specifies that vps_layer_joint_cbcr_qp_offset[i] for the i-th layer is not present in the VPS syntax. When not present, the value of vps_layer_joint_cbcr_qp_offset_present_flag[i] is taken to be equal to 0.

The syntax element vps_layer_joint_cbcr_qp_offset[i] specifies the offset for the i-th layer to the luma quantization parameter $Qp'_Y$ used for deriving $Qp'_{CbCr}$. The value of vps_layer_joint_cbcr_qp_offset[i] shall be in the range of −N to N, e.g. N as 12 inclusive. When not present, the value of vps_layer_joint_cber_qp_offset[i] is taken to be equal to 0.

The syntax elements vps_sublayer_cb_qp_offset[i] and vps_sublayer_cr_qp_offset[i] specify the offsets for the i-th temporal sublayer to the luma quantization parameter $Qp'_Y$ used for deriving $Qp'_{Cb}$ and $Qp'_{Cr}$, respectively. The values of vps_sublayer_cb_qp_offset[i] and vps_sublayer_cr_qp_offset[i] shall be in the range of −N to N, e.g. N as 12 inclusive. When not present, the values of vps_sublayer_cb_qp_offset[i] and vps_sublayer_cr_qp_offset[i] are taken to be equal to 0.

When vps_sublayer_joint_cbcr_qp_offset_present_flag[i] is equal to 1, it specifies that vps_sublayer_joint_cbcr_qp_offset[i] for the i-th temporal sublayer is present in the VPS syntax. The syntax element vps_sublayer_joint_cbcr_qp_offset_present_flag[i] being set to 0 specifies that vps_sublayer_joint_cbcr_qp_offset[i] for the i-th temporal sublayer is not present in the VPS syntax. When not present, the value of vps_sublayer_joint_cbcr_qp_offset_present_flag[i] is taken to be 0.

The syntax element vps_sublayer_joint_cbcr_qp_offset[i] specifies the offset for the i-th temporal sublayer to the luma quantization parameter $Qp'_Y$ used for deriving $Qp'_{CbCr}$. The value of vps_sublayer_joint_cbcr_qp_offset[i] shall be in the range of −N to N, e.g. N as 12 inclusive. When not present, the value of vps_sublayer_joint_cber_qp_offset[i] is taken to be equal to 0.

The syntax element vps_layer_deblocking_params_present_flag, when equal to 1, specifies that deblocking $t_C$ and β offset syntax elements for luma, cb and cr components in each layer is present in the VPS. When vps_layer_deblocking_params_present_flag is equal to 0, it specifies that deblocking $t_C$ and β offset syntax elements for luma, cb and cr components in each layer is not present in the VPS, using 0-valued deblocking β and $t_C$ offsets for luma, cb and cr components in all layers.

When syntax element vps_layer_deblocking_filter_disabled_flag[i] is equal to 1, it specifies that for the i-th layer the deblocking filter is disabled for pictures referring to the VPS unless overridden for a picture or slice by the related flags specified in SPS, in PPS, in the PH or in the SH, respectively. A vps_layer_deblocking_filter_disabled_flag[i] equal to 0 specifies that the deblocking filter is enabled for pictures in the i-th layer referring to the VPS unless overridden for a picture or slice by the related flags specified in the VPS, in the picture parameter set (PPS), in the picture header (PH) or in SH, respectively. When not present, the value of vps_layer_deblocking_filter_disabled_flag[i] is taken to be equal to 0.

The syntax elements vps_layer_luma_beta_offset_div2[i] and vps_layer_luma_tc_offset_div2[i] specify the default deblocking parameter offsets for β and $t_C$ (divided by 2) that are applied to the luma component for slices of the i-th layer referring to the VPS, unless the default deblocking parameter offsets are overridden by the deblocking parameter offsets specified in the SPS, in the PPS, in the picture headers, or the slice headers of the slices referring to the VPS. The values of vps_layer_luma_beta_offset_div2[i] and vps_layer_luma_tc_offset_div2[i] are defined to in the range of −N to N, e.g. N as 12 inclusive. When not present, the values of vps_layer_luma_beta_offset_div2[i] and vps_luma_tc_offset_div2[i] are taken to be equal to 0.

A syntax element, vps_layer_chroma_deblocking_filter_params_present_flag[i], equal to 1 specifies that deblocking $t_C$ and β offset syntax elements for cb and cr components for the i-th layer are present in the VPS. The syntax element vps_layer_chroma_deblocking_filter_params_present_flag[i] equal to 0 specifies that deblocking $t_C$ and β offset syntax elements for cb and cr components for the i-th layer are not present in the VPS.

The syntax elements vps_layer_cb_beta_offset_div2[i] and vps_cb_tc_offset_div2[i] specify the default deblocking parameter offsets for β and $t_C$ (divided by 2) that are applied to the cb component for slices of the i-th layer referring to the VPS, unless the default deblocking parameter offsets are overridden by the deblocking parameter offsets specified in the SPS, in the PPS, in the PH, or the SH of the slices referring to the VPS. The values of vps_layer_cb_beta_offset_div2[i] and vps_layer_cb_to_offset_div2[i] may be defined to be in the range of −N to N, e.g. N as 12 inclusive. When not present, the values of vps_layer_cb_beta_offset_div2[i] and vps_layer_cb_tc_offset_div2[i] are taken to be equal to 0.

The syntax elements vps_layer_cr_beta_offset_div2[i] and vps_cr_tc_offset_div2[i] may specify the default deblocking parameter offsets for β and $t_C$ (divided by 2) that are applied to the cr component for slices of the i-th layer referring to the VPS, unless the default deblocking parameter offsets are overridden by the deblocking parameter offsets specified in the SPS, in the PPS, in the PHs, or the SHs of the slices referring to the VPS. The values of vps_layer_cr_beta_offset_div2[i] and vps_layer_cr_to_offset_div2[i] shall be in the range of −N to N, e.g. N as 12 inclusive. When not present, the values of vps_layer_cr_beta_offset_div2[i] and vps_layer_cr_to_offset_div2[i] are taken to be equal to 0.

In some examples, vps_sublayer_deblocking_params_present_flag equal to 1 specifies that deblocking $t_C$ and β offset syntax elements for luma, cb and cr components in each temporal sublayer is present in the VPS. vps_sublayer_deblocking_params_present_flag equal to 0 specifies that deblocking $t_C$ and β offset syntax elements for luma, cb and cr components in each temporal sublayer is not present in the VPS, using 0-valued deblocking β and the offsets for luma, cb and cr components in all temporal layers.

A vps_sublayer_deblocking_filter_disabled_flag[i] equal to 1 specifies that for the i-th temporal sublayer the deblocking filter is disabled for pictures referring to the VPS unless overridden for a picture or slice by the related flags specified in SPS, in PPS, in the PH or in the SH, respectively. A vps_sublayer_deblocking_filter_disabled_flag[i] equal to 0 specifies that the deblocking filter is enabled for pictures in the i-th temporal sublayer referring to the VPS unless overridden for a picture or slice by the related flags specified in the SPS, in the PPS, in the PH or in SH, respectively. When not present, the value of vps_sublayer_deblocking_filter_disabled_flag[i] is taken to be equal to 0.

The syntax elements vps_sublayer_luma_beta_offset_div2[i] and vps_sublayer_luma_tc_offset_div2[i] specify the default deblocking parameter offsets for β and $t_C$ (divided by 2) that are applied to the luma component for slices of the i-th temporal sublayer referring to the VPS, unless the default deblocking parameter offsets are overridden by the deblocking parameter offsets specified in the SPS, in the PPS, in the picture headers, or the slice headers of the slices referring to the VPS. The values of vps_sublayer_luma_beta_offset_div2[i] and vps_sublayer_luma_tc_offset_div2[i] shall be in the range of −N to N, e.g. N as 12 inclusive. When not present, the values of vps_sublayer_luma_beta_offset_div2[i] and vps_sublayer_luma_tc_offset_div2[i] are taken to be equal to 0.

In some examples, a vps_sublayer_chroma_deblocking_filter_params_present_flag[i] equal to 1 specifies that deblocking $t_C$ and β offset syntax elements for cb and cr components for the i-th temporal sublayer are present in the VPS. A vps_layer_chroma_deblocking_filter_params_present_flag[i] equal to 0 specifies that deblocking $t_C$ and β offset syntax elements for cb and cr components for the i-th temporal sublayer are not present in the VPS.

The syntax elements vps_sublayer_cb_beta_offset_div2[i] and vps_sublayer_cb_tc_offset_div2[i] specify the default deblocking parameter offsets for β and $t_C$ (divided by 2) that are applied to the cb component for slices of the i-th temporal sublayer referring to the VPS, unless the default deblocking parameter offsets are overridden by the deblocking parameter offsets specified in the SPS, in the PPS, in the picture headers, or the slice headers of the slices referring to the VPS. The values of vps_sublayer_cb_beta_offset_div2[i] and vps_sublayer_cb_tc_offset_div2[i] are defined to be in the range of −N to N, e.g. N as 12 inclusive. When not present, the values of vps_sublayer_cb_beta_offset_div2[i] and vps_sublayer_cb_tc_offset_div2[i] are taken to be equal to 0.

The syntax elements vps_sublayer_cr_beta_offset_div2[i] and vps_sublayer_cr_tc_offset_div2[i] specify the default deblocking parameter offsets for β and $t_C$ (divided by 2) that are applied to the cr component for slices of the i-th temporal sublayer referring to the VPS, unless the default deblocking parameter offsets are overridden by the deblocking parameter offsets specified in the SPS, in the PPS, in the PHs, or the SHs of the slices referring to the VPS. The values of vps_sublayer_cr_beta_offset_div2[i] and vps_sublayer_cr_tc_offset_div2[i] are defined to be in the range of −N to N, e.g. N as 12 inclusive. When not present, the values of vps_sublayer_cr_beta_offset_div2[i] and vps_sublayer_cr_tc_offset_div2[i] may be taken to be equal to 0.

In some examples, when vps_layer_partitioning_information_present_flag is equal to 1, it specifies that vps_layer_MaxMTTHierarchyDepth for the i-th layer is present in the VPS syntax. A vps_layer_partitioning_information_present_flag equal to 0 specifies that vps_layer_MaxMTTHierarchyDepth for the i-th layer is not present in the VPS syntax. When not present, the value of vps_layer_partitioning_information_present_flag is taken to be equal to 0.

The syntax parameter vps_layer_MaxMTTHierarchyDepth [i] specifies the value of MaxMTTHierarchyDepth for the i-th layer. The value may be defined as being either 2, 3 or 4.

When vps_sublayer_partitioning_information_present_flag is equal to 1, it specifies that vps_sublayer_MaxMTTHiearchyDepth for the i-th temporal sublayer is present in the VPS syntax. When vps_sublayer_partitioning_information_present_flag is equal to 0, it specifies that vps_sublayer_MaxMTTHiearchyDepth for the i-th temporal sublayer is not present in the VPS syntax. When not present, the value of vps_sublayer_partitioning_information_present_flag is taken to be equal to 0.

In further examples, vps_sublayer_MaxMTTHierarchyDepth[i] specifies the value of MaxMTTHierarchyDepth for the i-th temporal layer. The value is defined to be 2, 3, or 4.

In further examples, SPS syntax elements are set forth below with respect to table 2.

TABLE 2

Layer-based and Temporal Sublayer-based SPS Syntaxr

| seq_parameter_set_rbsp( ) { | Descriptor |
|---|---|
| ... | |
| sps_max_sublayers_minus1 | u(3) |
| sps_chroma_format_idc | u(2) |
| ... | |
| sps_sublayer_chroma_qp_offset_present_flag | u(1) |
| if( sps_sublayer_chroma_qp_offset_present_flag){ | |
| for( i = 0; i <= sps_max_sublayers_minus1; i++ ) { | |
| sps_sublayer_cb_qp_offset[ i ] | se(v) |
| sps_sublayer_cr_qp_offset[ i ] | se(v) |
| sps_sublayer_joint_cbcr_qp_offset_present_flag[i] | u(1) |
| if ( sps_sublayer_joint_cbcr_qp_offset_present_flag[i] ) | |
| sps_sublayer_joint_cbcr_qp_offset[ i ] | se(v) |
| } | |
| } | |
| ... | |
| sps_sublayer_deblocking_params_present_flag | u(1) |
| if( sps_sublayer_deblocking_params_present_flag ) { | |
| for( i = 0; i <= sps_max_sublayers_minus1; i++ ) { | |
| sps_sublayer_deblocking_filter_disabled_flag[i] | u(1) |
| if( !sps_sublayer_deblocking_filter_disabled_flag[i]){ | |
| sps_sublayer_luma_beta_offset_div2[i] | se(v) |
| sps_sublayer_luma_tc_offset_div2[i] | se(v) |
| sps_sublayer_chroma_deblocking_filter_params_present_flag[i] | u(1) |
| if( sps_sublayer_chroma_deblocking_filter_params_present_flag[i] ){ | |
| sps_sublayer_cb_beta_offset_div2[i] | se(v) |
| sps_sublayer_cb_tc_offset_div2[i] | se(v) |
| sps_sublayer_cr_beta_offset_div2[i] | se(v) |
| sps_sublayer_cr_tc_offset_div2[i] | se(v) |
| } | |
| } | |
| ... | |
| sps_sublayer_partitioning_information_present_flag | u(1) |
| if( sps_sublayer_partitioning_information_present_flag) { | |
| for( i = 0; i <= sps_max_sublayers_minus1; i++ ) { | |
| sps_sublayer_MaxMTTHierarchyDepth[i] | ue(v) |
| } | |
| } | |
| } | |

In some examples, the syntax elements sps_sublayer_cb_qp_offset[i] and sps_sublayer_cr_qp_offset[i] may specify the offset for the i-th temporal sublayer to the luma quantization parameter $Qp'_Y$ used for deriving $Qp'_{Cb}$ and $Qp'_{Cr}$, respectively. The values of sps_sublayer_cb_qp_offset[i] and sps_sublayer_cr_qp_offset[i] shall be in the range of −N to N, e.g. N as 12 inclusive. When not present, the values of sps_sublayer_cb_qp_offset[i] and sps_sublayer_cr_qp_offset[i] are taken to be equal to 0.

When sps_sublayer_joint_cbcr_qp_offset_present_flag[i] is equal to 1, it specifies that sps_sublayer_joint_cbcr_qp_offset[i] for the i-th temporal sublayer is present in the SPS syntax. When sps_sublayer_joint_cbcr_qp_offset_present_flag[i] is equal to 0, it specifies that sps_sublayer_joint_cbcr_qp_offset[i] for the i-th temporal sublayer is not present in the SPS syntax. When not present, the value of sps_sublayer_joint_cbcr_qp_offset_present_flag[i] is taken to be equal to 0.

The syntax element sps_sublayer_joint_cbcr_qp_offset[i] specifies the offset for the i-th temporal sublayer to the luma quantization parameter $Qp'_Y$ used for deriving $Qp'_{CbCr}$. The value of sps_sublayer_joint_cbcr_qp_offset[i] is defined to be in the range of −N to N, e.g. N as 12 inclusive. When not present, the value of sps_sublayer_joint_cbcr_qp_offset[i] is taken to be equal to 0.

A sps_sublayer_deblocking_params_present_flag equal to 1 specifies that deblocking $t_C$ and β offset syntax elements for luma, cb and cr components in each temporal sublayer is present in the SPS. A sps_sublayer_deblocking_params_present_flag equal to 0 specifies that deblocking $t_C$ and β offset syntax elements for luma, cb and cr components in each temporal sublayer is not present in the SPS, and a 0 value for deblocking β and the offsets for luma, cb and cr components is used in all temporal layers.

A sps_sublayer_deblocking_filter_disabled_flag[i] equal to 1 specifies that for the i-th temporal sublayer, the deblocking filter is disabled for pictures referring to the SPS unless overridden for a picture or slice by the related flags specified in PPS, in the PH or in the SH, respectively. A sps_sublayer_deblocking_filter_disabled_flag[i] equal to 0 specifies that the deblocking filter is enabled for pictures in the i-th temporal sublayer referring to the SPS unless overridden for a picture or slice by the related flags specified in the PPS, in the PH or in SH, respectively. When not present, the value of sps_sublayer_deblocking_filter_disabled_flag[i] is taken to be equal to 0.

The syntax parameters sps_sublayer_luma_beta_offset_div2[i] and sps_sublayer_luma_tc_offset_div2[i] specify the default deblocking parameter offsets for β and $t_C$ (divided by 2) that are applied to the luma component for slices of the i-th temporal sublayer referring to the SPS, unless the default deblocking parameter offsets are overridden by the deblocking parameter offsets specified in the PPS, in the picture headers, or the slice headers of the slices referring to the SPS. The value of sps_sublayer_luma_beta_offset_div2[i] and sps_sublayer_luma_tc_offset_div2[i] may be defined to be in the range of −N to N, e.g. N as 12 inclusive. When not present, the values of sps_sublayer_luma_beta_offset_div2[i] and sps_sublayer_luma_tc_offset_div2[i] are taken to be equal to 0.

A sps_sublayer_chroma_deblocking_filter_params_present_flag[i] equal to 1 specifies that deblocking $t_C$ and β offset syntax elements for cb and cr components for the i-th temporal sublayer are present in the SPS. A sps_layer_chroma_deblocking_filter_params_present_flag[i] equal to 0 specifies that deblocking $t_C$ and β offset syntax elements for cb and cr components for the i-th layer are not present in the SPS. When the value of sps_chroma_format_idc is 0, it is taken to be 0.

The syntax elements sps_sublayer_cb_beta_offset_div2[i] and sps_sublayer_cb_tc_offset_div2[i] specify the default deblocking parameter offsets for β and $t_C$ (divided by 2) that are applied to the cb component for slices of the i-th temporal sublayer referring to the SPS, unless the default deblocking parameter offsets are overridden by the deblocking parameter offsets specified in the PPS, in the picture headers, or the slice headers of the slices referring to the SPS. The value of sps_sublayer_cb_beta_offset_div2[i] and sps_sublayer_cb_tc_offset_div2[i] shall be in the range of –N to N, e.g. N as 12 inclusive. When not present, the values of sps_sublayer_cb_beta_offset_div2[i] and sps_sublayer_cb_tc_offset_div2[i] are taken to be equal to 0.

The syntax elements sps_sublayer_cr_beta_offset_div2[i] and sps_sublayer_cr_tc_offset_div2[i] specify the default deblocking parameter offsets for β and $t_C$ (divided by 2) that are applied to the cr component for slices of the i-th temporal sublayer referring to the SPS, unless the default deblocking parameter offsets are overridden by the deblocking parameter offsets present in the PPS, in the picture headers, or the slice headers of the slices referring to the SPS. The value of sps_sublayer_cr_beta_offset_div2[i] and sps_sublayer_cr_tc_offset_div2[i] may be defined to be in the range of –N to N, e.g. N as 12 inclusive. When not present, the values of sps_sublayer_cr_beta_offset_div2[i] and sps_sublayer_cr_tc_offset_div2[i] are taken to be equal to 0.

A sps_sublayer_partitioning_information_present_flag equal to 1 specifies that sps_sublayer_MaxMTTHierarchyDepth for the i-th temporal sublayer is present in the SPS syntax. A sps_sublayer_partitioning_information_present_flag equal to 0 specifies that sps_sublayer_MaxMTTHierarchy Depth for the i-th temporal sublayer is not present in the SPS syntax. When not present, the value of sps_sublayer_partitioning_information_present_flag is taken to be equal to 0.

In further examples, sps_sublayer_MaxMTTHierarchyDepth[i] may specify the value of MaxMTTHierarchy Depth for the i-th temporal layer. The value may be defined to be 2, 3 or 4.

Accordingly, in various embodiments, instead of transmitting cb_tc_offset_div2 and cr_tc_offset_div2 separately, it is proposed to transmit joint_cbcr_to_offset_div2 either in the VPS, in the SPS, in the PPS, in the picture header or in the slice header. Also, instead of transmitting cb_beta_offset_div2 and cr_beta_offset_div2 separately, it is proposed to transmit joint_cbcr_beta_offset_div2 either in the VPS, in the SPS, in the PPS, in the picture header or in the slice header.

In various embodiments, the values of chroma QPs for the i-th layer and the j-th sublayer $Qp'_{Cb}$ and $Qp'_{Cr}$, and joint Cb-Cr coding $Qp'_{CbCr}$ may be derived as follows in Eqs. 1-3:

$$Qp'_{Cb} = \text{Clip3}(-QpBdOffset, 63, qP_{Cb} + \text{vps\_layer\_cb\_qp\_offset}[i] + \text{sublayer\_cb\_qp\_offset}[j] + \text{pps\_cb\_qp\_offset} + \text{sh\_cb\_qp\_offset} + CuQpOffset_{Cb}) + QpBdOffset \quad \text{(Eq. 1)}$$

$$Qp'_{Cr} = \text{Clip3}(-QpBdOffset, 63, qP_{Cr} + \text{vps\_layer\_cr\_qp\_offset}[i] + \text{sublayer\_cr\_qp\_offset}[j] + \text{pps\_cr\_qp\_offset} + \text{sh\_cr\_qp\_offset} + CuQpOffset_{Cr}) + QpBdOffset \quad \text{(Eq. 2)}$$

$$Qp'_{CbCr} = \text{Clip3}(-QpBdOffset, 63, qP_{CbCr} + \text{vps\_layer\_joint\_cbcr\_qp\_offset}[i] + \text{sublayer\_joint\_cbcr\_qp\_offset}[j] + \text{pps\_joint\_cbcr\_qp\_offset\_value} + \text{sh\_joint\_cbcr\_qp\_offset} + CuQpOffset_{CbCr}) + QpBdOffset \quad \text{(Eq. 3)}$$

In further embodiments, the process of deriving sh_luma_tc_offset_div2 and sh_luma_beta_offset_div2 for each slice may be specified as follows:

If the value of vps_layer_deblocking_params_present_flag is 1, vps_layer_luma_tc_offset_div2[i] and vps_layer_luma_beta_offset_div2[i] for the i-th layer shall be applied for sh_luma_tc_offset and sh_luma_beta_offset respectively.

If the value of vps_sublayer_deblocking_params_present_flag is 1, vps_sublayer_luma_tc_offset_div2[j] and vps_sublayer_luma_beta_offset_div2[j] for the j-th sublayer shall be applied for sh_luma_tc_offset_div2 and sh_luma_beta_offset_div2 respectively.

If the value of sps_sublayer_deblocking_params_present_flag is 1, sps_sublayer_luma_tc_offset_div2[j] and sps_sublayer_luma_beta_offset_div2[j] for the j-th layer shall be applied for sh_luma_tc_offset_div2 and sh_luma_beta_offset_div2 respectively, overwriting vps_sublayer_luma_tc_offset_div2[j] and vps_sublayer_luma_beta_offset_div2[j] if the value of vps_sublayer_deblocking_params_present_flag is 1.

In further examples, the process of deriving sh_cb_tc_offset_div2/sh_cr_tc_offset_div2 and sh_cb_beta_offset_div2/sh_cr_beta_offset_div2 for each slice may be as given as follows:

If the value of vps_layer_chroma_qp_offset_present_flag is 1, vps_layer_cb_tc_offset_div2[i]/vps_layer_cr_tc_offset_div2[i] and vps_layer_cb_beta_offset_div2[i]/vps_layer_cb_beta_offset_div2[i] for the i-th layer shall be applied for sh_cb_tc_offset_div2/sh_cr_tc_offset_div2 and sh_cb_beta_offset_div2/sh_cr_beta_offset_div2 respectively.

If the value of vps_sublayer_deblocking_params_present_flag is 1, vps_sublayer_cb_tc_offset_div2[j]/vps_sublayer_cr_tc_offset_div2[j] and vps_sublayer_cb_beta_offset_div2[j]/vps_sublayer_cr_beta_offset_div2[j] for the j-th temporal sublayer shall be applied for sh_cb_tc_offset_div2/sh_cr_tc_offset_div2 and sh_cb_beta_offset_div2/sh_cr_beta_offset_div2 respectively.

If the value of sps_sublayer_deblocking_params_present_flag is 1, sps_sublayer_cb_tc_offset_div2[j]/sps_sublayer_cr_tc_offset_div2[j] and sps_sublayer_cb_beta_offset_div2[j]/sps_sublayer_cr_beta_offset_div2[j] for the j-th temporal sublayer shall be applied for sh_cb_tc_offset_div2/sh_cr_tc_offset_div2 and sh_cb_beta_offset_div2/sh_cr_beta_offset_div2 respectively.

Once the encoded bit stream is generated, as described above, with layer-based and temporal sublayer-based coding parameters (e.g., syntax elements), the encoded bit stream may be transmitted, via network 315, to a decoder 320. The network 315 may include a communications network as described in greater detail below with respect to FIG. 7. Decoder 320 may, in turn, be configured to decode the encoded bit stream to generate a decoded picture based on the layer-specific and temporal sublayer-specific coding parameter.

In various examples, the partitioning logic 305, encoder 310, and decoder 320 may be implemented as hardware, software, and/or both hardware and software. For example, the partitioning logic 305, encoder 310, and decoder 320 may include one or more microprocessors, digital signal processors (DSP), application specific integrated circuits (ASICs), field programmable gate arrays (FPGAs), discrete logic, software, firmware, or a combination of software and hardware. Features and logic implemented in software may be stored in corresponding non-transitory computer-readable media and/or storage device.

Figure 4:
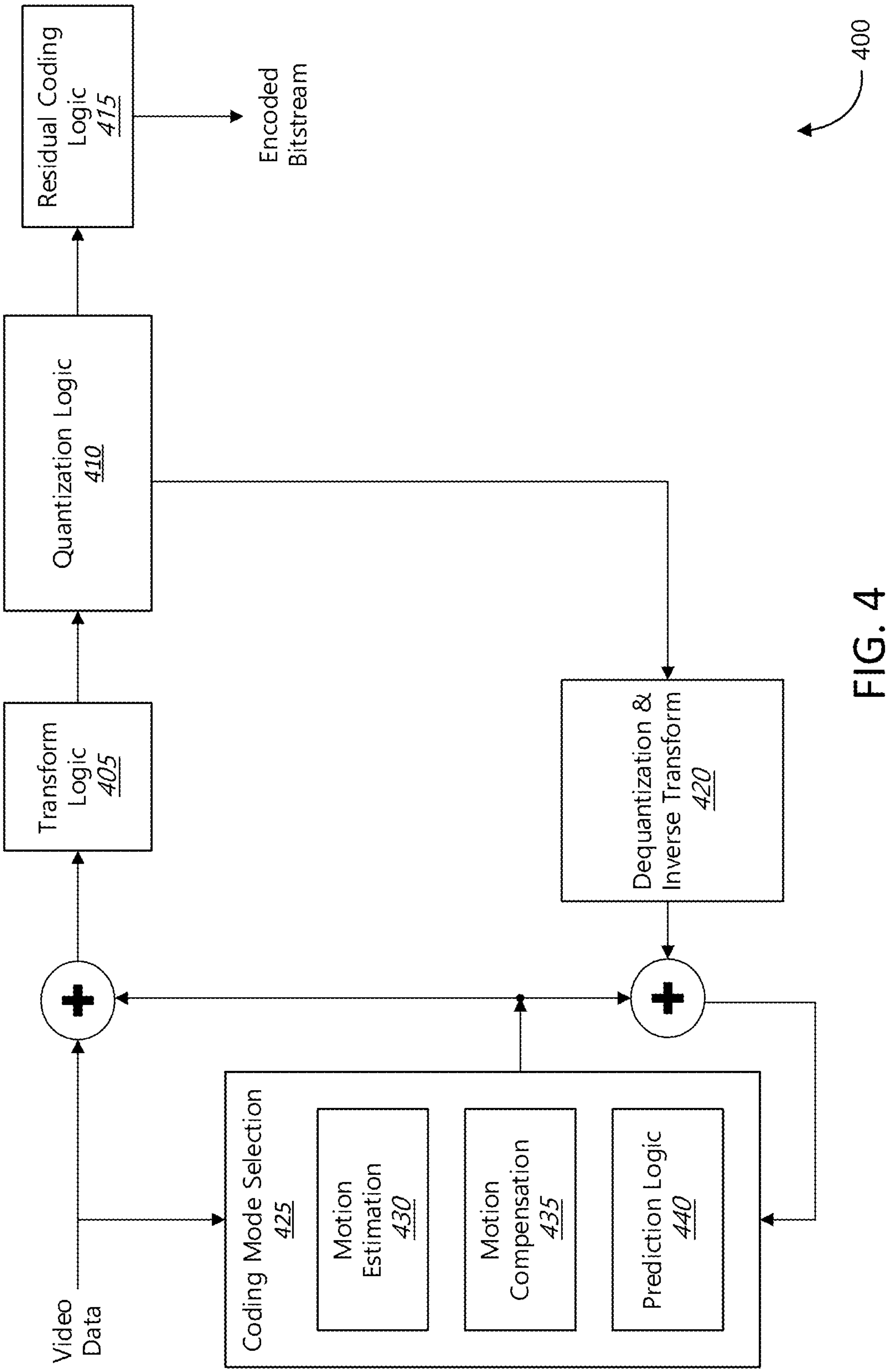
FIG. 4 is a block diagram of a media encoding system, in accordance with various embodiments.

FIG. 4 is a block diagram of a media encoding system 400, in accordance with various embodiments. The media encoding system 400 may include transform logic 405, quantization logic 410, residual coding logic 415, dequantization and inverse transform logic 420, and coding mode selection logic 425, which may include motion estimation logic 430, motion compensation logic 435, and prediction logic 440. It should be noted that the various components of the media encoding system 400 are schematically illustrated in FIG. 4, and that modifications to the media encoding system 400 may be possible in accordance with the various embodiments.

In various embodiments, the media encoding system 400 may be implemented on any suitable hardware, such as one or more microprocessors, digital signal processors (DSP), application specific integrated circuits (ASICs), field programmable gate arrays (FPGAs), discrete logic, software, hardware, or a combination of software and hardware. Features and logic implemented in software may be stored in corresponding non-transitory computer-readable media and/or storage devices. This is discussed in greater detail below with respect to FIG. 8.

In various embodiments, the video data may include an image (e.g., a frame) of the video data, also referred to as a block or macroblock (e.g., CTU). The video data may be provided to the coding mode selection logic 425, which may be configured to produce a predicted image (e.g., a prediction block) utilizing prediction logic 440.

In various embodiments, the coding mode selection logic 425 may be configured to specify a coding mode. The coding mode may include specifying an intra coding mode, such an angular intra coding mode. Based on the coding mode, prediction logic 440 may perform intra prediction and generate a predicted image.

In some embodiments, the predicted image may be subtracted from an actual subsequent image of the frame to produce a residual frame (e.g., a residual block), and transform logic 405 may transform the residual block to produce a block of transformed video data from the residual frame. The block of transformed video data may be provided to the quantization logic 410. In other examples, the video data may be provided directly to the quantization logic 410, without undergoing transformation. As previously described, in some examples, a block may include a CTU, subdivision of a CTU, or CU.

Quantization logic 410 may be configured to quantize the transformed or non-transformed video data to produce a block of quantization levels. The quantization logic 410 may, in some examples, produce sets of quantization levels. In some embodiments, the quantized block may be processed by the residual coding logic 415. The residual coding logic 415 may be configured to convert the data of the quantized block into an encoded bit stream, utilizing the layer-based and temporal sublayer-based syntax and coding conventions as previously described with respect to FIG. 3 and Tables 1-2. Specifically, chroma QP offset parameters, deblocking filter parameters, and block partitioning parameters may be coded on a layer and/or temporal sublayer basis and combined into the bit stream by the residual coding logic 415. In some examples, additional parameters, such as a scaling list, ALF, and/or SAO parameters may be coded on a layer- and/or temporal sublayer-basis.

In some embodiments, the quantized block may further be provided to the dequantization & inverse transform logic 420 for further processing. For example, in some embodiments, the dequantization and inverse transform logic may be used to generate a reconstructed residual block. The reconstructed residual block may be added to the next predicted frame and used for motion estimation logic 430, motion compensation logic 435, and prediction logic 440 to produce a prediction block.

Figure 5:
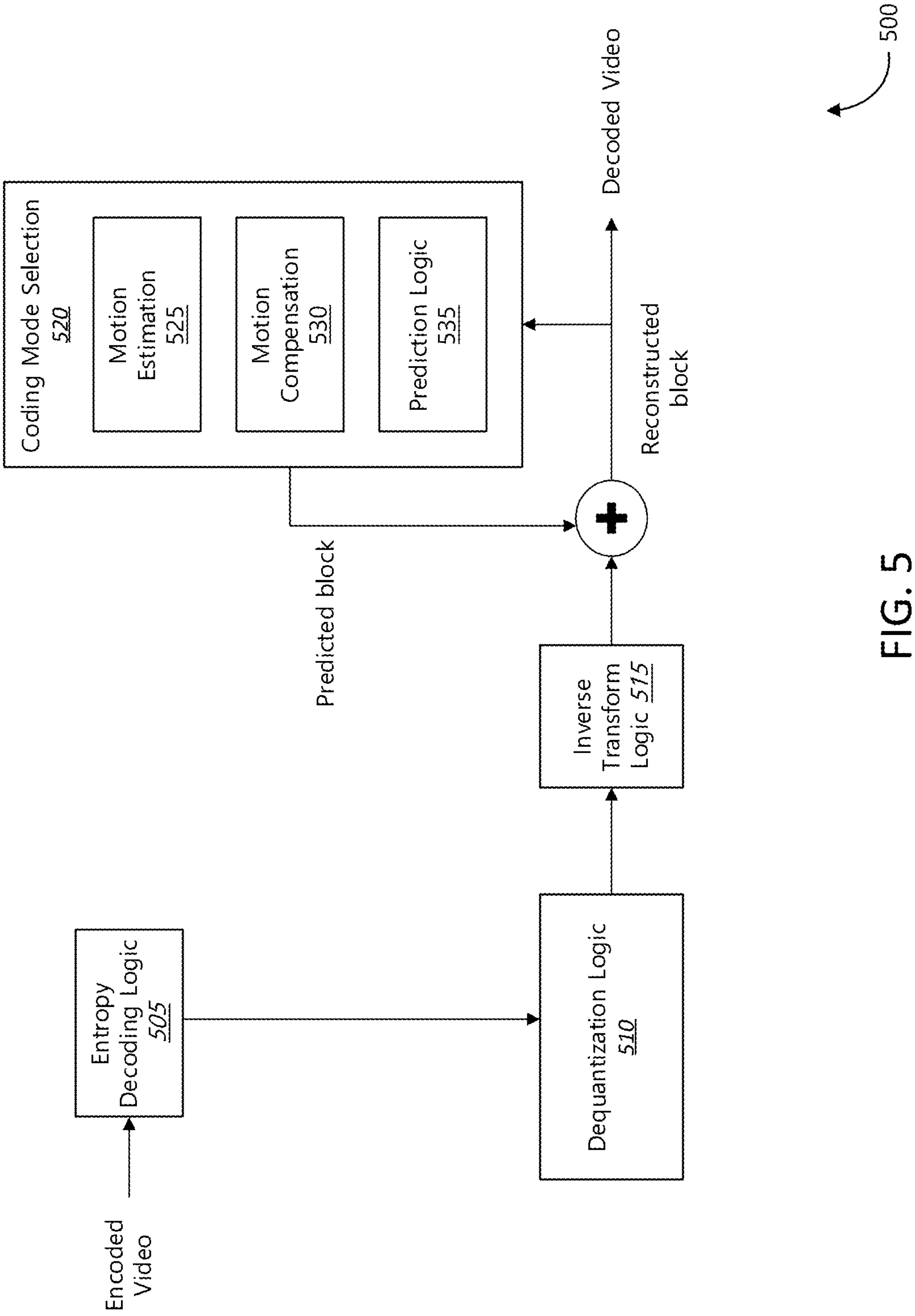
FIG. 5 is a block diagram of a media decoding system, in accordance with various embodiments.

FIG. 5 is a block diagram of a media decoding system 500, in accordance with various embodiments. The media decoding system 500 may include entropy decoding logic 505, dequantization logic 510, inverse transform logic 515, coding mode selection logic 520, motion estimation logic 525, motion compensation logic 530, and intra prediction logic 535. It should be noted that the various components of the media decoding system 500 are schematically illustrated in FIG. 5, and that modifications to the media encoding system 500 may be possible in accordance with the various embodiments.

In various embodiments, like the media encoding system 400, the media decoding system 500 may be implemented on any suitable hardware, such as one or more microprocessors, DSP, ASIC, FPGA, discrete logic, software, hardware, or a combination of software and hardware. In various embodiments, the encoded video data may include a bit stream of encoded video blocks. Accordingly, entropy decoding logic 505 may be configured to decode the encoded bit stream of video data. Specifically, the encoded bit stream may be decoded and quantized elements extracted from the encoded bit stream for further processing utilizing the layer-based and temporal sublayer-based syntax and coding conventions as previously described with respect to FIG. 3 and Tables 1-2. Specifically, chroma QPs, deblocking filter parameters, and block partitioning parameters may be determined on a layer and/or temporal sublayer basis from the bit stream by the entropy decoding logic 505. In some examples, additional parameters, such as a scaling list, ALF, and/or SAO parameters may be decoded on a layer- and/or temporal sublayer-basis.

In some examples, the quantized elements may then be inverse quantized (or dequantized) by the dequantization logic 510 according to chroma QPs decoded from the bit stream on a layer and/or temporal sublayer basis. The inverse transform logic 515 may inverse transform the coefficient produced by the dequantization logic 510. In some examples, for blocks where the transform is skipped, the inverse transform module is not applied to those blocks.

In further examples, the residual block, produced by the dequantization logic 510 may be added to a corresponding prediction block, produced by the coding mode selection logic 520, to generate a reconstructed block. The reconstructed block may then be provided to the coding mode selection logic 520 to produce a subsequent prediction block. Thus, the dequantized elements produced by the dequantization logic 510 may be used to generate the reconstructed block, with a decoded video may be produced. As discussed above with respect to FIG. 4, the prediction block may be generated according to a coding mode and intra prediction parameters and according to motion estimation logic 525, motion compensation logic 530, and intra prediction logic 535.

Figure 6:
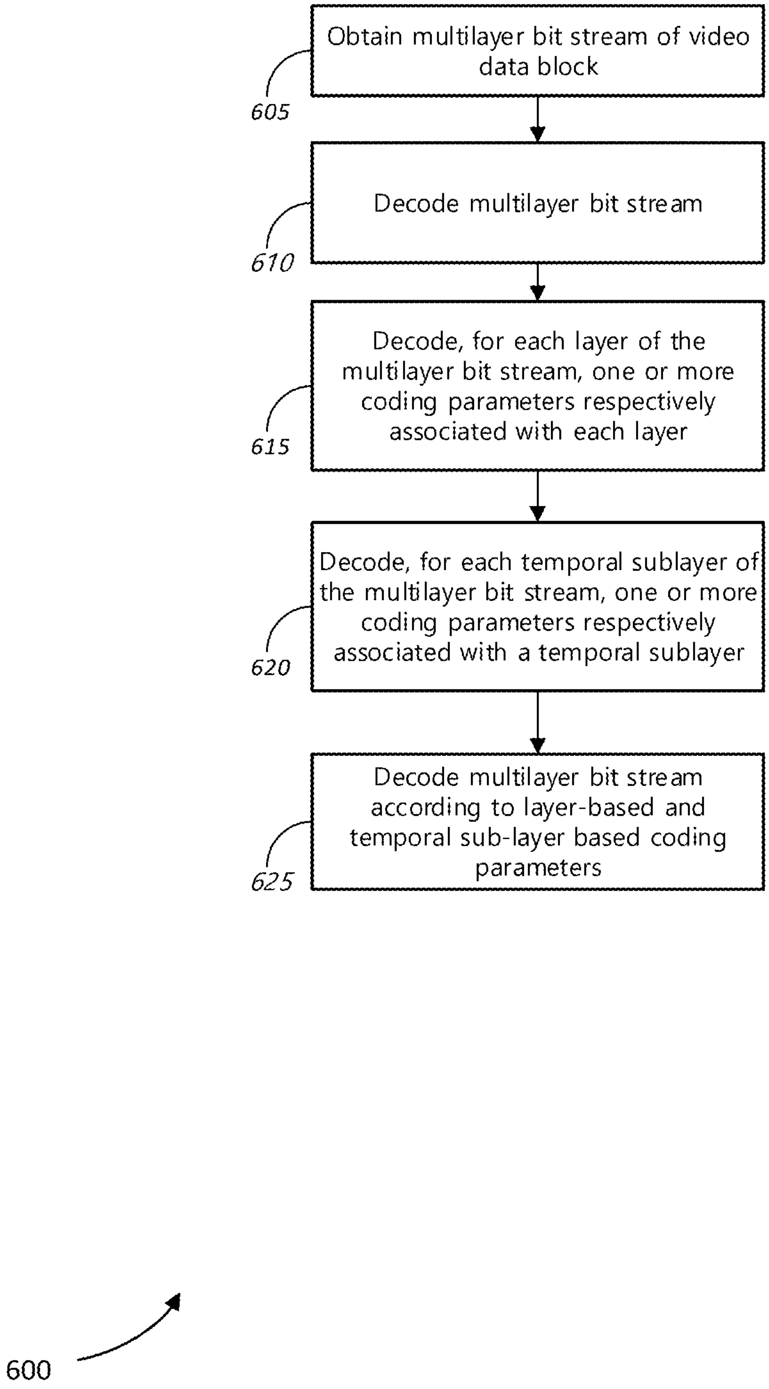
FIG. 6 is a flow diagram for layer-based and temporal sublayer-based coding, in accordance with various embodiments.

FIG. 6 is a flow diagram of a method 600 for layer-based and temporal sublayer-based coding, in accordance with various embodiments. The method 600 begins, at block 605, by obtaining a multilayer bit stream of a video data block. As previously described, in some embodiments, a block of video data may include, without limitation, a CTU, subdivision of a CTU, or CU. The block of video data may further include transformed and/or non-transformed video data.

At block 610, the method 600 continues by decoding the multilayer bit stream of the video data block. In various embodiments, decoding the video data block may extracting portioning information from the multilayer bit stream. Partitioning information may include information specifying a portioning scheme of the video data block. Partitioning of the video data block may include partitioning the video data block into one or more slices, and further into one or more CTUs and/or CUs. In other embodiments, the video data block may already be partitioned. In various examples, encoding the video data may include generating a predicted image (e.g., a predicted block), generating a residual block based on the predicted block, transforming the residual block to produce a transformed block, and quantizing the transformed block. The quantized block (e.g., quantized transformed block) may be converted into a bit stream via residual coding logic, as previously described. In this way, a multilayer bit stream may be generated from the video data block, and portioning information extracted from the multilayer bit stream.

The method 600 continues, at block 615, by decoding, from the multilayer bit stream, one or more respective coding parameters for each respective layer of the multilayer bit stream. In various examples, decoding one or more respective parameters for each respective layer may include decoding layer-specific coding parameters for each layer, where the layer-specific coding parameters may be associated (e.g., applicable to) a respective layer independently of other layers in the multilayer bit stream. Layer-specific coding parameters may include, without limitation, chroma QP offset (e.g., a QP offset for luma to extract the QP for chroma) specific to a respective layer. In further examples, deblock filter parameters (e.g., $t_C$ and β offset) and block partitioning parameters (e.g., MaxMTTHierarchyDepth) for a block (e.g., CU) may be defined for each respective layer, independently. In various examples, the coding parameters may be decoded as part of VPS. In some further examples, block partitioning parameters, such as MaxMTTHierarchyDepth, may be coded in SPS for each layer (and/or temporal sublayer as will be described in greater detail below). In some further embodiments, further layer-specific coding parameters may include a scaling list, ALF, and/or SAO parameters.

At block 620, the method 600 includes decoding, from the multilayer bit stream, for each of one or more temporal sublayers of the multilayer bit stream, one or more coding parameters respectively associated with a respective temporal sublayer of the one or more temporal sublayers. As with the layers, in various examples, decoding the one or more coding parameters for each of the one or more temporal sublayers may include decoding temporal sublayer-specific coding parameters, where the coding parameters may be associated (e.g., applicable to) a respective temporal sublayer independently of other temporal sublayers in the multilayer bit stream. Temporal sublayer-specific coding parameters may include, without limitation, chroma QP offset (e.g., a QP offset for luma to extract the QP for chroma) specific to a respective temporal sublayer, deblock filter parameters (e.g., $t_C$ and β offset), and block partitioning parameters (e.g., MaxMTTHierarchy Depth) for a block (e.g., CU) may be defined for each respective layer, independently. In various examples, the coding parameters may decoded as VPS and/or SPS. In some further embodiments, further temporal sublayer-specific coding parameters may include a scaling list, ALF, and/or SAO parameters.

At block 625, the method 600 includes decoding the multilayer bit stream, according to the layer-based and sublayer-based coding parameters as described above.

Figure 7:
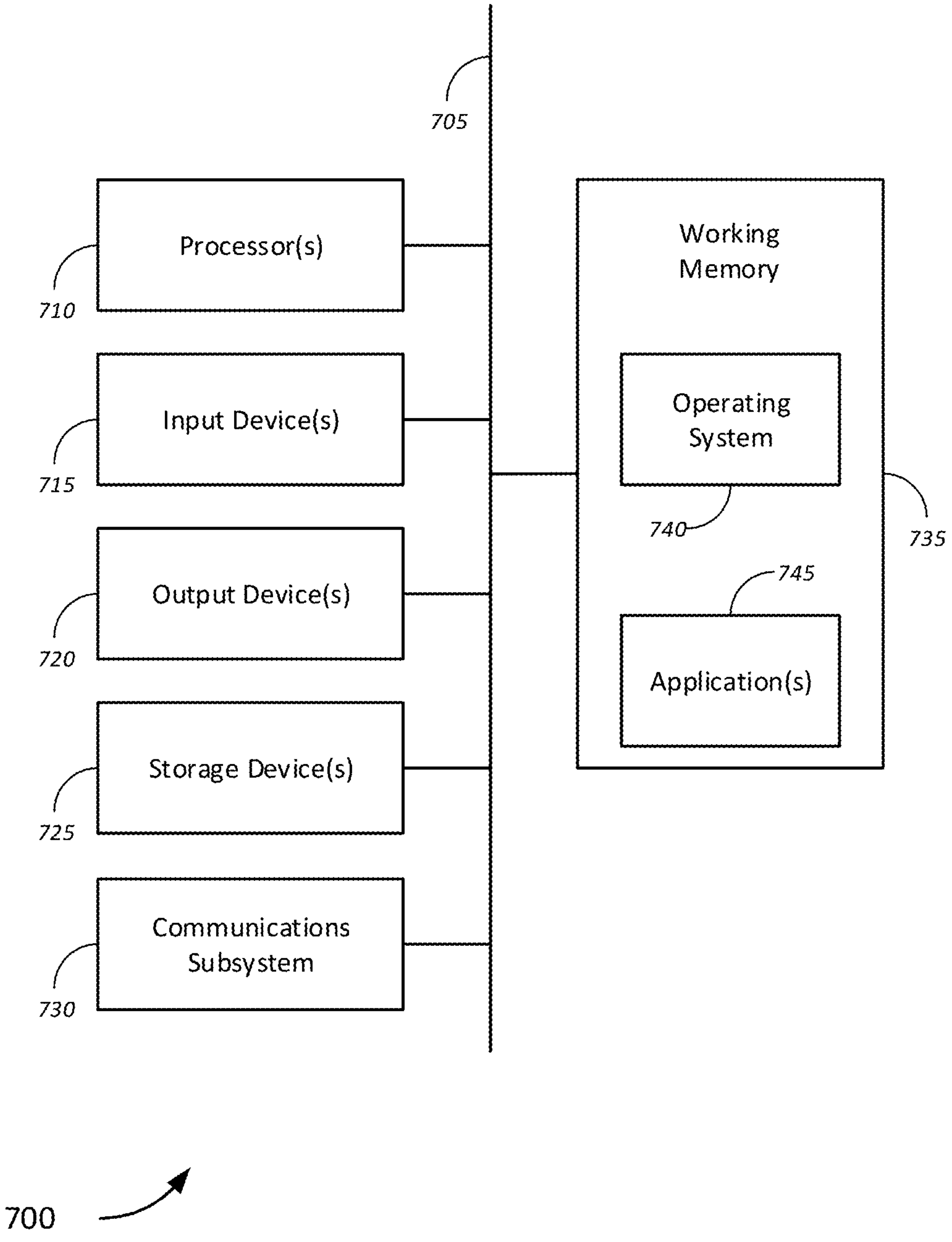
FIG. 7 is a schematic block diagram of a computer system for layer-based and temporal sublayer-based coding, in accordance with various embodiments.

The techniques and processes described above with respect to various embodiments may be performed by one or more computer systems. FIG. 7 is a schematic block diagram of a computer system 700 for layer-based and temporal sublayer-based coding, in accordance with various embodiments. FIG. 7 provides a schematic illustration of one embodiment of a computer system 700, such as in media coding systems 400, 500, or subsystems thereof, which may perform the methods provided by various other embodiments, as described herein. It should be noted that FIG. 7 only provides a generalized illustration of various components, of which one or more of each may be utilized as appropriate. FIG. 7, therefore, broadly illustrates how individual system elements may be implemented in a separated or integrated manner.

The computer system 700 includes multiple hardware elements that may be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processor (DSP) including vector DSP (VDSP), graphics processing units, and microcontrollers); one or more input devices 715, which include, without limitation, a mouse, a keyboard, one or more sensors, and/or the like; and one or more output devices 720, which can include, without limitation, a display device, and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 700 might also include a communications subsystem 730, which may include, without limitation, a modem, a network card (wireless or wired), an IR communication device, a wireless communication device and/or chipset (such as a Bluetooth™ device, an 702.11 device, a WiFi device, a WiMax device, a WWAN device, a Z-Wave device, a ZigBee device, cellular communication facilities, etc.), and/or a low-power wireless device. The communications subsystem 730 may permit data to be exchanged with a network (such as the network described below, to name one example), with other computer or hardware systems, between data centers or different cloud platforms, and/or with any other devices described herein. In many embodiments, the computer system 700 further comprises a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 700) to perform methods in accordance with various embodiments of the invention. According to a set of embodiments, some or all of the procedures of such methods are performed by the computer system 700 in response to processor 710 executing one or more sequences of one or more instructions (which may be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally receives the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a storage device 725 either before or after execution by the processor(s) 710.

While some features and aspects have been described with respect to the embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while some functionality is ascribed to one or more system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise. Consequently, although several embodiments are described above, it will be appreciated that the invention is intended to cover all modifications and equivalents within the scope of the following claims.

What is claimed is:

1. A method comprising:

obtaining a multilayer bit stream of a video data block;

decoding the multilayer bit stream of the video data block, the multilayer bit stream comprising at least part of the video data block that has been encoded, wherein the multilayer bit stream includes one or more layers and one or more temporal sublayers; and decoding, from the multilayer bit stream, one or more first coding parameters, wherein the one or more first coding parameters are independently associated with a first layer of the one or more layers.

2. The method of claim 1, further comprising:

decoding the first layer of the multilayer bit stream according to the one or more first coding parameters.

3. The method of claim 1, wherein the one or more first coding parameters includes one or more of a quantization parameter offset, a deblocking filter parameter, or a block partitioning parameter.

4. The method of claim 3, wherein the one or more first coding parameters includes syntax elements in a video parameter set (VPS).

5. The method of claim 1, further comprising decoding, from the multilayer bit stream, one or more second coding parameters, wherein the one or more second coding parameters are independently associated with a first temporal sublayer of the one or more temporal sublayers.

6. The method of claim 5, further comprising:

decoding the first temporal sublayer of the multilayer bit stream according to the one or more second coding parameters.

7. The method of claim 5, wherein the one or more second coding parameters includes one or more of a quantization parameter offset, deblocking filter parameter, or a block partitioning parameter.

8. The method of claim 7, wherein the one or more second coding parameters includes syntax elements in a sequence parameter set (SPS).

9. A non-transitory computer readable medium in communication with a processor, the non-transitory computer readable medium having encoded thereon a set of instructions executable by the processor to:

obtain a multilayer bit stream of a video data block;

decode the multilayer bit stream of the video data block, the multilayer bit stream comprising at least part of the video data block that has been encoded, wherein the multilayer bit stream includes one or more layers and one or more temporal sublayers; and decode, from the multilayer bit stream, one or more first coding parameters, wherein the one or more first coding parameters are independently associated with one of:

a layer of the one or more layers; or a temporal sublayer of the one or more temporal sublayers.

10. The non-transitory computer readable medium of claim 9, wherein the set of instructions is further executable by the processor to:

decode one of the layer of the one or more layers or the temporal sublayer of the one or more temporal sublayers according to the one or more first coding parameters.

11. The non-transitory computer readable medium of claim 9, wherein the one or more first coding parameters includes one or more of a quantization parameter offset, a deblocking filter parameter, or a block partitioning parameter.

12. The non-transitory computer readable medium of claim 11, wherein the one or more first coding parameters further includes one or more of a scaling list, adaptive loop filter parameter, or sample adaptive offset.

13. The non-transitory computer readable medium of claim 11, wherein the block partitioning parameter is defined for each layer of the one or more layers and each temporal sublayer of the one or more temporal sublayers.

14. The non-transitory computer readable medium of claim 11, wherein the quantization parameter includes a quantization parameter offset for luma to extract the quantization parameter for chroma for the layer of the one or more layers.

15. The non-transitory computer readable medium of claim 9, wherein the one or more first coding parameters includes syntax elements in a video parameter set (VPS) or sequence parameter set (SPS).

16. A video coding system comprising:

a decoder further comprising:

a processor;

a non-transitory computer readable medium in communication with the processor, the non-transitory computer readable medium having encoded thereon a set of instructions executable by the processor to:

decode a multilayer bit stream of a video data block, the multilayer bit stream comprising at least part of the video data block that has been encoded, wherein the multilayer bit stream includes one or more layers and one or more temporal sublayers; and decode, from the multilayer bit stream, one or more first coding parameters, wherein the one or more first coding parameters are independently associated with a layer of the one or more layers.

17. The video coding system of claim 16, further comprising an encoder in communication with the decoder, wherein the set of instructions is further executable by the processor to:

receive the multilayer bit stream from the encoder; and decode the layer of the one or more layers according to the one or more first coding parameters.

18. The video coding system of claim 16, wherein the one or more first coding parameters includes one or more of a quantization parameter offset, a deblocking filter parameter, or a block partitioning parameter.

19. The video coding system of claim 16, wherein the set of instructions is further executable by the processor to:

decode, from the multilayer bit stream, one or more second coding parameters, wherein the one or more second coding parameters are independently associated with a temporal sublayer of the one or more temporal sublayers.

20. The video coding system of claim 19, further comprising an encoder in communication with the decoder, wherein the set of instructions is further executable by the processor to:

receive the multilayer bit stream from the encoder; and decode the temporal sublayer of the one or more temporal sublayers according to the one or more second coding parameters.

* * * * *